(12) United States Patent
Hsu et al.

(10) Patent No.: US 11,262,831 B2
(45) Date of Patent: Mar. 1, 2022

(54) MODIFICATIONS OF POWER ALLOCATIONS FOR GRAPHICAL PROCESSING UNITS BASED ON USAGE

(71) Applicant: Hewlett-Packard Development Company, L.P., Spring, TX (US)

(72) Inventors: Chun Jung Hsu, Taipei (TW); Lung Chi Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/043,021

(22) PCT Filed: Aug. 17, 2018

(86) PCT No.: PCT/US2018/000267
§ 371 (c)(1),
(2) Date: Sep. 29, 2020

(87) PCT Pub. No.: WO2020/036573
PCT Pub. Date: Feb. 20, 2020

(65) Prior Publication Data
US 2021/0157383 A1    May 27, 2021

(51) Int. Cl.
*G06F 1/26* (2006.01)
*G06F 1/32* (2019.01)
*G06F 1/3206* (2019.01)
*G06F 1/20* (2006.01)
*G06F 1/3287* (2019.01)

(52) U.S. Cl.
CPC ............ *G06F 1/3206* (2013.01); *G06F 1/206* (2013.01); *G06F 1/3287* (2013.01)

(58) Field of Classification Search
CPC .......... G06F 1/26; G06F 1/206; G06F 1/3206; G06F 1/3226; G06F 1/3287; G06F 1/329; Y02D 10/00
See application file for complete search history.

(56) References Cited

U.S. PATENT DOCUMENTS

| 8,830,245 B2 | 9/2014 | Bone et al. |
| 9,142,004 B2 | 9/2015 | Abiezzi et al. |
| 9,746,898 B2 | 8/2017 | Grossmann et al. |
| 9,760,967 B2 | 9/2017 | Shah et al. |
| 2003/0183373 A1 | 10/2003 | Sarraf et al. |

(Continued)

FOREIGN PATENT DOCUMENTS

CN      101901042 B    7/2011
WO   WO-2014178450 A1  11/2014

*Primary Examiner* — Nitin C Patel
(74) *Attorney, Agent, or Firm* — Conley Rose P.C.

(57) ABSTRACT

An example non-transitory computer-readable medium storing machine-readable instructions that, when executed by a processor, cause the processor to: set a graphical processing unit (GPU) power allocation, the GPU power allocation indicating power available for use by a GPU. The processor sets a processor power allocation, the processor power allocation indicating power available for use by the processor. The processor receives a GPU usage value and modifies the GPU power allocation to a modified GPU power allocation based on the GPU usage value. The processor modifies the processor power allocation to a modified processor power allocation based on the modification of the GPU power allocation.

13 Claims, 7 Drawing Sheets

(56) References Cited

U.S. PATENT DOCUMENTS

| | | | |
|---|---|---|---|
| 2011/0022833 A1* | 1/2011 | Nussbaum | G06F 1/324 |
| | | | 713/100 |
| 2014/0052965 A1 | 2/2014 | Sarel | |
| 2014/0089699 A1 | 3/2014 | O'Connor et al. | |
| 2014/0189708 A1 | 7/2014 | Lee et al. | |
| 2019/0377395 A1* | 12/2019 | Kaburlasos | G06F 1/3206 |

* cited by examiner

MODIFICATIONS OF POWER ALLOCATIONS FOR GRAPHICAL PROCESSING UNITS BASED ON USAGE

BACKGROUND

In computer systems, a central processor may control operation of the computer system. Some computer systems also include a graphical processing unit (GPU) to perform processing related to rendering images for display on a display screen.

BRIEF DESCRIPTION OF THE DRAWINGS

Various examples will be described below referring to the following figures.

DETAILED DESCRIPTION

Figure 1:
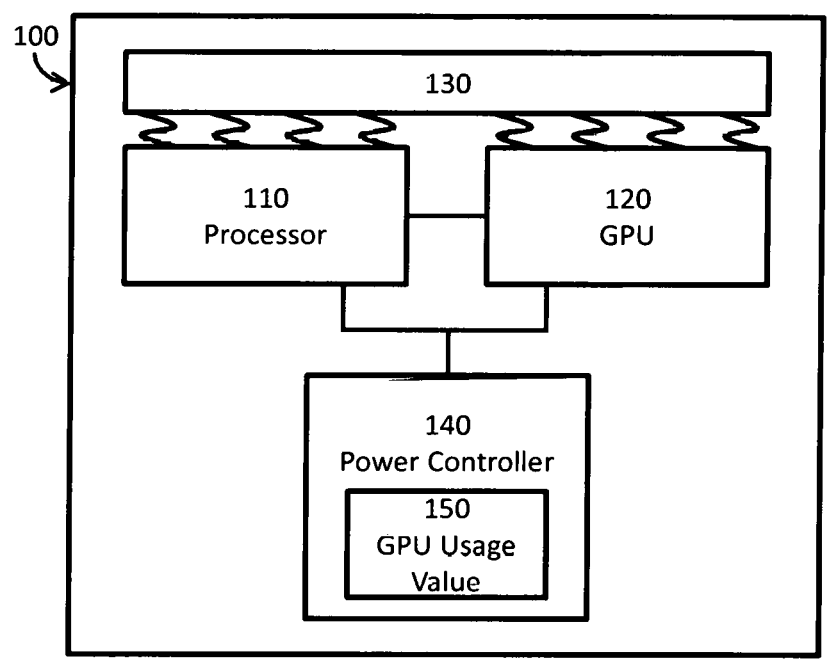
FIG. 1 shows a computer system with a processor, a GPU, and a power controller in accordance with various examples.

Computer systems may include a central processor and a GPU. Execution of different applications on a computer system may place different performance loads on the processor and GPU. Some applications may be GPU intensive, and performance of the application is limited by the GPU. Other applications may be processor intensive. Some applications may be GPU intensive at certain times, but processor intensive at other times. Different processor and GPU models may be used together in the same computer system. While an application may be processor intensive with a certain processor and GPU combination, it may be GPU intensive with a different processor and GPU combination. Applications also often have graphics settings, which may alter whether the application is processor or GPU intensive.

A power controller could determine whether a running application is GPU intensive and adjust a power allocation between the processor and GPU. Some processors and some GPUs may be set to different power settings. A higher power setting may enable the processor or GPU to have more processing power, while a lower power setting may be more efficient or produce less heat. The power controller may determine the GPU is operating under a high workload and raise the power allocation for the GPU. Raising the power allocation for the GPU may cause the power allocation for the processor to be lowered. If the GPU workload decreases, the power controller may detect that and lower the GPU power allocation. Lowering the GPU power allocation may allow the processor power allocation to be raised. The power controller may also monitor the temperature of the GPU, processor, or other devices in determining a power allocation.

In one example in accordance with the present disclosure, a device is provided. The device comprises a non-transitory computer-readable medium storing machine-readable instructions that, when executed by a processor, cause the processor to set a graphical processing unit (GPU) power allocation, the GPU power allocation indicating power available for use by a GPU, set a processor power allocation, the processor power allocation indicating power available for use by the processor, receive a GPU usage value; modify the GPU power allocation to a modified GPU power allocation based on the GPU usage value, and modify the processor power allocation to a modified processor power allocation based on the modification of the GPU power allocation.

In one example in accordance with the present disclosure, a system is provided. The system comprises a processor, a graphical processing unit (GPU) coupled to the processor via a bus, a heat dissipator thermally coupled to the processor and the GPU, and a power controller, coupled to the processor and GPU, to control a processor power allocation indicating the power available for use by the processor and to control a GPU power allocation indicating the power available for use by the GPU, wherein the GPU power allocation is based on a GPU usage value.

In one example in accordance with the present disclosure, a device is provided. The device comprises a non-transitory computer-readable medium storing machine-readable instructions that, when executed by a processor, cause the processor to receive a first graphical processing unit (GPU) usage value of a GPU, determine that the first GPU usage value is lower than a predetermined GPU usage value, set the GPU to be in a first GPU power mode based on the determination that the first GPU usage value is lower than the predetermined GPU usage value, the first GPU power mode comprising a first power draw of the GPU, receive a second GPU usage value, determine that the second GPU usage value is higher than the predetermined GPU usage value, and set the GPU to be in a second GPU power mode based on the determination that the second GPU usage value is higher than the predetermined GPU usage value, the second GPU power mode comprising a second power draw of the GPU, wherein the second power draw is greater than the first power draw.

FIG. 1 shows a computer system 100 with a processor 110, a GPU 120, and a power controller 140 in accordance with various examples. The processor 110 and GPU 120 may be coupled together via a bus. The computer system 100 may include a heat dissipator 130 and a power controller 140. The power controller 140 may be coupled to the processor 110 and the GPU 120. In various examples, the power controller 140 may couple to the processor 110 or GPU 120 through the bus. The power controller 140 may comprise a GPU usage value 150. The GPU usage value 150 may indicate the workload or utilization rate of the GPU. The power controller 140 may obtain the GPU usage value 150 from the GPU 120.

The processor 110 may be a central processing unit (CPU) of the computer system 100. The processor 110 may comprise a microprocessor, microcomputer, discrete logic, or other processing capabilities. The processor 110 may retrieve machine-readable instructions from a storage device and execute the machine-readable instructions.

The GPU 120 may comprise a dedicated graphics processor, memory, peripheral logic, or discrete logic. The GPU 120 may be part of a discrete graphics card or be integrated into a motherboard.

A heat dissipator moves thermal energy away from a component to keep a component cooler. The heat dissipator 130 may be part of an overall cooling system for the computer system 100. The heat dissipator 130 may include a heat sink, fan, liquid cooling system, heat pipe, heat exchanger, refrigerant system, or other active or passive device to move heat away from the processor 110 or GPU 120. The heat dissipator 130 may be thermally coupled to the processor 110 and the GPU 120. The processor 110 and GPU 120 may share a thermal load via the heat dissipator 130. For example, the heat dissipator 130 may dissipate enough heat to allow the processor 110 to operate at a high workload while the GPU 120 operates at a low workload, or for the GPU 120 to operate at a high workload while the processor 110 operates at a low workload, but the heat dissipator 130 may not dissipate enough heat to allow both the processor 110 and the GPU 120 to operate at high workloads for extended periods of time.

The power controller 140 may be part of the processor 110. The power controller 140 may be a separate component from the processor 110 or share some circuitry. The power controller 140 may control the allocation of power to the processor 110 and the GPU 120. The processor 110 may be able to operate at different power levels, for example between 25 watts (W) and 50 W at 2.5 W intervals. The GPU 120 may be able to operate at different power levels, for example at 80 W or 90 W. The amount of power for power allocation may be limited so that the processor 110 and GPU 120 cannot both be set to their maximum power levels. For example, if 130 W is available for the processor 110 and GPU 120, the processor 110 may be allocated 40 W and the GPU 120 may be allocated 90 W, or the processor 110 may be allocated 50 W and the GPU 120 may be allocated 80 W. The power controller 140 may allocate less power between the processor 110 and GPU 120 than is available. For example, the power controller 140 may allocate 30 W to the processor 110 and 80 W to the GPU 120, even though 150 W is available.

The power controller 140 may base its power allocations to the processor 110 and GPU 120 on a GPU usage value 150. The power controller 140 may obtain the GPU usage value 150 from the GPU 120. In various examples, the power controller 140 may calculate a GPU usage value 150, such as by tracking the number or type of instructions being executed by the GPU 120. The GPU usage value 150 may be based on the actual power consumption of the GPU 120.

The power controller 140 may control the allocation of power by changing settings of the processor 110 or GPU 120. In various examples, the processor 110 or GPU 120 may include settings that specify the maximum power the device is to draw from a power supply. The power controller 140 may control the power allocation by changing such settings on the processor 110 or GPU 120.

In various examples, the power controller 140 may control the power allocation to the processor 110 or GPU 120 by controlling the voltage or current supply provided to the processor 110 or GPU 120. For example, the power controller 140 may lower the voltage available to the processor 110 or GPU 120 but not change the power draw settings on the processor 110 or GPU 120. In response, the processor 110 or GPU 120 may increase its clock speed and draw more current. The higher clock speed may allow the processor 110 or GPU 120 to perform a higher workload while consuming the same power. A minimal voltage setting may be required by the processor 110 or GPU 120 to ensure stability of the device. The processor 110 or GPU 120 may allow the power controller 140 to change clock settings on the processor 110 or GPU 120, such as changing the clock frequency to affect performance.

In various examples, the power controller 140 may perform initial power allocations to the processor 110 and GPU 120. The power controller 140 may monitor the GPU usage value 150 at various points in time to determine if the power allocations should change, such as once per second or once per millisecond. If the GPU usage value 150 is high, the power controller 140 may increase the GPU power allocation. If increasing the GPU power allocation would place the combined GPU power allocation and processor power allocation above the available power, the power controller 140 may decrease the processor power allocation. If the GPU usage value 150 is low, the power controller 140 may decrease the GPU power allocation and increase the processor power allocation. Other events, such as a low battery for a notebook computer or entering a low-power mode may affect the power controller's 140 power allocations. The power controller 140 may also consider a processor usage value. For example, there may be times when the processor 110 and GPU 120 are both relatively idle, and both can be set to relatively low power allocations.

Figure 2:
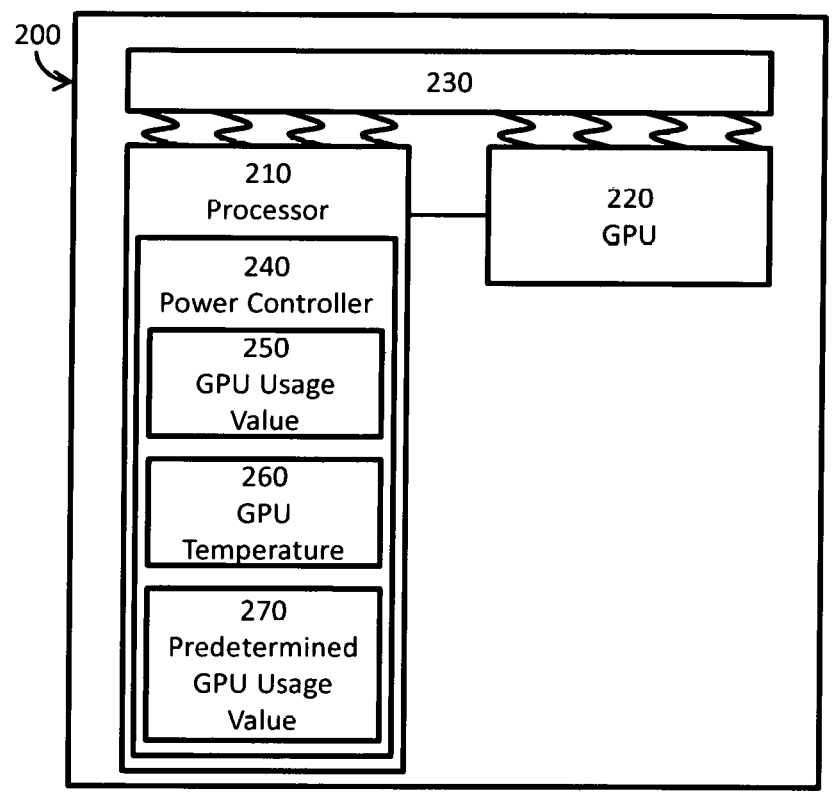
FIG. 2 shows a computer system with a processor with a power controller and a GPU in accordance with various examples.

FIG. 2 shows a computer system 200 with a processor 210 with a power controller 240 and a GPU 220 in accordance with various examples. The processor 210 may be coupled to the GPU 220 via a bus. The processor 210 may comprise the power controller 240. For example, the processor 210 may execute machine-readable instructions that, when executed, implement the power controller 240. The machine-readable instructions may be stored on a computer-readable medium, such as a hard drive or solid state drive. The computer system 200 may include a heat dissipator 230. The heat dissipator 230 may be thermally coupled to the processor 210 and the GPU 220. The power controller 240 may include a GPU usage value 250, a GPU temperature 260, and a predetermined GPU usage value 270.

The power controller 240 may be coupled to the GPU 220 via the bus coupling the processor 210 and the GPU 220. The power controller 240 may obtain the GPU usage value 250 and GPU temperature 260 from the GPU 220. This may be done by accessing registers or settings for the GPU 220, accessing memory where the GPU 220 has stored the data, or requesting and receiving the data from the GPU 220. Such operations may be performed through device driver software for the GPU 220. The GPU temperature 260 may be obtained from a thermocouple or other temperature sensor placed in close proximity to the GPU 220 or embedded in the GPU 220. The power controller 240 may also obtain and use temperatures of the processor 210 and heat dissipator 230 in allocating power to the processor 210 and the GPU 220. The predetermined GPU usage value 270 may be a value determined by empirical data. The predetermined GPU usage value 270 may indicate a point above which the GPU 220 may substantially benefit from having a higher power allocation.

In various examples, the power controller 240 may allocate power to the processor 210 and GPU 220 based on the GPU usage value 250 and the GPU temperature 260. The power controller 240 may determine that the GPU usage value 250 is above the predetermined GPU usage value 270 and that the GPU temperature 260 is beneath a target value and thus increase the GPU power allocation. If increasing the GPU power allocation would allocate more than the available power, the power controller 240 may decrease the processor power allocation to remain within an overall power budget for the processor 210 and GPU 220. As the GPU usage value 250 is high, performance of the computer system 200 may be limited by performance of the GPU 220. Increasing the GPU power allocation may increase the performance of the GPU 220 and thus the overall computer system 200. As the GPU usage value 250 is high, the processor 210 may not have a high workload, as it may be waiting for results from the GPU 220. In such a case, modifying the power allocation may result in a performance boost. Even if the processor 210 suffers some performance drop due to the modified power allocation, the overall performance of the computer system 200 may be boosted.

In various examples, the power controller 240 may determine that the GPU usage value 250 is above the predetermined GPU usage value 270 and that the GPU temperature 260 is at or above a target value. The power controller 240 may decrease the processor power allocation in an effort to reduce the heat produced by the processor 210 and dissipated by the heat dissipator 230 shared between the processor 210 and the GPU 220. If the GPU temperature 260 is sufficiently high, the power controller 240 may decrease both the processor power allocation and the GPU power allocation. Once the GPU temperature 260 has fallen below the target value, the power controller 240 may increase the processor power allocation or GPU power allocation. If the GPU usage value 250 is high, overall performance of the computer system 200 may be higher if the processor power allocation is reduced rather than reducing the GPU power allocation. If the processor power allocation is already at its lowest value, the GPU power allocation may be reduced in an effort to further lower the GPU temperature 260.

In various examples, the power controller 240 may determine that the GPU usage value 250 is below the predetermined GPU usage value 270 and that the GPU temperature 260 is above the target value. The power controller 240 may reduce the GPU power allocation in an effort to decrease the GPU temperature 260. If the GPU temperature 260 is sufficiently high, or the GPU power allocation is already at its lowest value, the power controller 240 may reduce the processor power allocation. A time delay may be used after decreasing the GPU power allocation and before decreasing the processor power allocation to allow for the GPU temperature 260 to potentially drop. The power controller 240 may run from time to time to determine if power allocations should change, thus causing a time delay. The power controller 240 may track how long since the most recent re-allocation and wait a minimum delay time before adjusting the allocation of power again, though some conditions, such as a high temperature, may cause the power controller 240 to violate the minimum delay time. If the GPU usage value 250 is not high, the GPU may not be gaining much benefit from a higher power allocation. Reducing the GPU power allocation may result in better overall performance of the computer system 200 than reducing the processor power allocation. Once the GPU temperature 260 is below the target value, the power controller 240 may raise the processor power allocation or GPU power allocation.

In various examples, the power controller 240 may determine that the GPU usage value 250 is below the predetermined GPU usage value 270 and that the GPU temperature 260 is below the target value. The power controller 240 may increase the processor power allocation. As the GPU usage value 250 is not high, the GPU 220 may be waiting on data or requests from the processor 210. Increasing the processor power allocation may increase the performance of the processor and thus overall performance of the computer system 200.

The predetermined GPU usage value 270 may include multiple values. For example, the power controller 240 may compare the GPU usage value 250 against a first predetermined GPU usage value 270 in determining when to increase the GPU power allocation. After the GPU power allocation has been increased, the power controller 240 may compare the GPU usage value 250 against a smaller second predetermined GPU usage value 270 in determining when to decrease the GPU power allocation. Use of different values when raising and lowering the GPU power allocation and processor power allocation may prevent frequent shifts in power allocations if the GPU usage value is hovering around the predetermined GPU usage value 270. Multiple predetermined GPU usage values 270 may also indicate different points at which to further increase the GPU power allocation. In various examples, the GPU usage value 250 and predetermined GPU usage value 270 may take the GPU power allocation into account. The target temperature may include multiple temperature values. For example, the power controller 240 may lower the processor power allocation or GPU power allocation if the GPU temperature 260 is 194° Fahrenheit (F) or above, but wait until the temperate has fallen below 185° F. before increasing the processor power allocation or GPU power allocation again. The power controller 240 may also receive a processor temperature and consider the processor temperature in changing power allocations. For example, if the processor 210 has a processor temperature above 203° F., the processor power allocation may be decreased while keeping the GPU power allocation the same. Based on the GPU usage value 250, the GPU power allocation may be decreased while keeping the processor power allocation the same. The power allocation to the processor 210 or GPU 220 may be increased again once the processor temperature has fallen below 194° F. In various examples, if the processor temperature or GPU temperature goes above a certain temperature, the power allocation for that device may be decreased without regard to the GPU usage value 250.

The benefits of redistributing the power allocation between the processor 210 and the GPU 220 of a computer system 200 can be demonstrated with the example of video games. Some video games, such as first person role-playing games (RPG), may have complex backgrounds and objects to render. In such games, there may be an emphasis on making a beautiful world for the player to interact with and view. Such video games may be generally GPU intensive, frequently having a high GPU usage value 250. The processor 210 may have a low workload while the GPU 220 is busy rendering a mountain landscape in the background. In such a case, the GPU 220 may experience a performance boost with a higher GPU power allocation, while the processor 210 may not experience any performance loss or just a minimal loss with a lower processor power allocation. Without modifying any of the in-game graphics settings for the RPG, allocating more power to the GPU 220 may result in the computer system 200 rendering a higher number of frames per second (FPS), resulting in smoother looking play experience. In some video games, such as a real-time strategy game (RTS), the game may have numerous units to keep track of, and artificial intelligence (AI) to apply to the units. Such video games may be processor intensive but not GPU intensive, as a small set of those units may be rendered on the screen at any one time. In such a case, the processor 210 may experience a performance boost with a higher processor power allocation, while the GPU 220 may not experience any performance loss or just a minimal loss with a lower GPU power allocation. Without modifying any of the in-game graphics settings for the RTS, allocating more power to the processor 210 may result in the computer system 200 rendering a higher overall FPS. This may be because with the higher processor power allocation, the processor 210 can provide a higher throughput of data for processing by the GPU 220. As the power allocation may be redistributed on-the-fly throughout gameplay, as conditions change, the computer system 200 may provide a higher FPS for the games than if no power allocation redistribution is performed.

Figure 3:
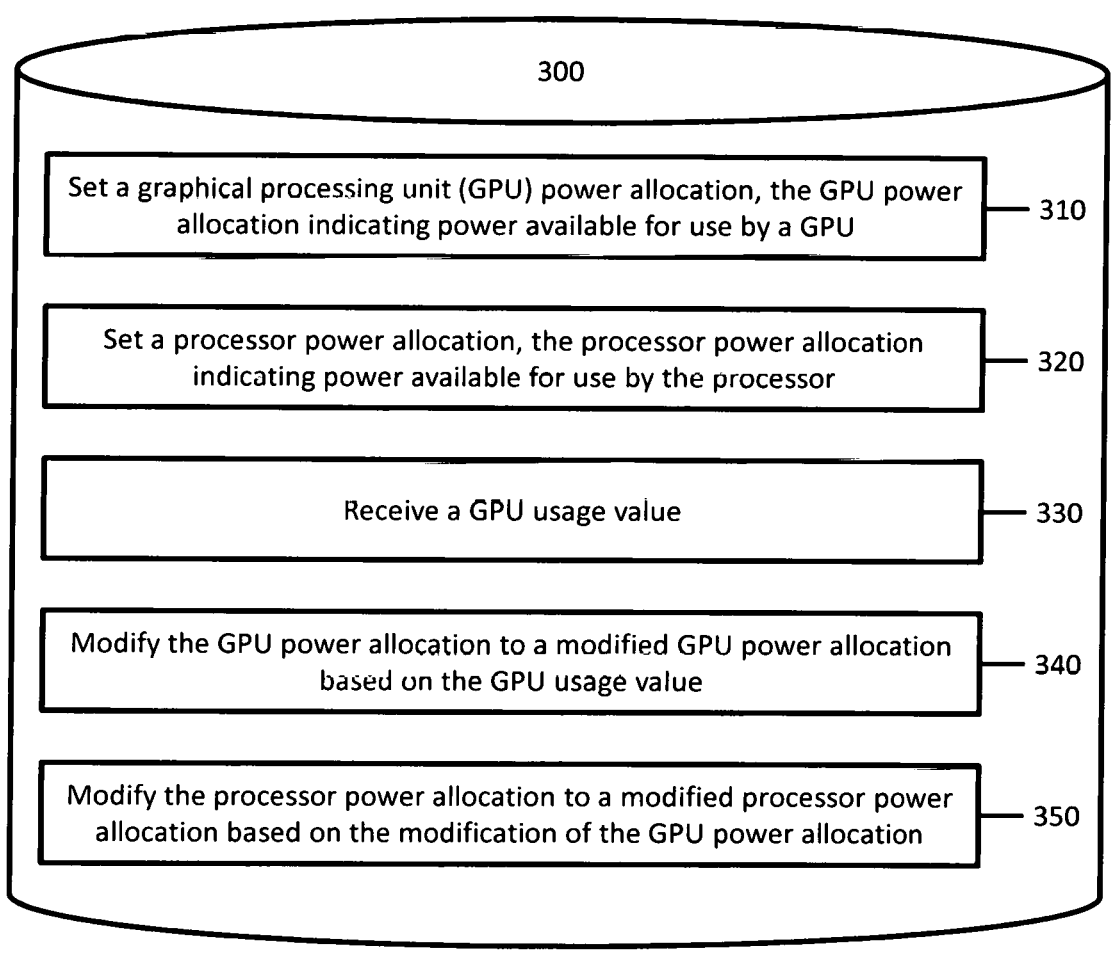
FIG. 3 shows a computer-readable medium containing machine-readable instructions for execution by a processor to modify a GPU power allocation in accordance with various examples.

FIG. 3 shows a computer-readable medium 300 containing machine-readable instructions 310, 320, 330, 340, 350 for execution by a processor to modify a GPU power allocation in accordance with various examples. The machine-readable instructions 310, 320, 330, 340, 350 may be executable by a processor, such as discussed in FIGS. 1 and 2, and be part of an application for implementing a power controller. Computer-readable medium 300 may comprise volatile or non-volatile memory to store data or computer-readable instructions, such as static random access memory (SRAM), dynamic random access memory (DRAM), a hard drive, solid state drive (SSD), Flash memory, or electrically erasable programmable read-only memory (EEPROM). Computer-readable medium 300 may be part of an overall system, such as a computer system. Computer-readable medium 300 may include instructions 310 to set a graphical processing unit (GPU) power allocation, the GPU power allocation indicating power available for use by a GPU. Computer-readable medium 300 may include instructions 320 to set a processor power allocation, the processor power allocation indicating power available for use by the processor. Computer-readable medium 300 may include instructions 330 to receive a GPU usage value. Computer-readable medium 300 may include instructions 340 to modify the GPU power allocation to a modified GPU power allocation based on the GPU usage value. Computer-readable medium 300 may include instructions 350 to modify the processor power allocation to a modified processor power allocation based on the modification of the GPU power allocation.

A computer system may have a power budget. Some power may be budgeted for long-term computer-readable media, such as hard drives or solid state drives. Some power may be budgeted for short-term computer-readable media, such as random access memory (RAM) or read-only memory (ROM). Some power may be budgeted for a sound system. Some power may be budgeted for the processor and for the GPU. The computer system may be able to modify the power allocated to the processor and the GPU within the overall power budget for those devices. The processor may set a GPU power allocation and a processor power allocation based on the power budget. The processor may set the GPU power allocation and the processor power allocation below the power budget when the computer system is mostly idle.

The processor may be able to receive a GPU usage value. This GPU usage value may come from the GPU or be calculated by the processor or power controller. The processor may modify the GPU power allocation and the processor power allocation based on the GPU usage value. If the GPU usage value is high, power may be shifted from the processor power allocation to the GPU power allocation. If the GPU usage value is low, power may be shifted from the GPU power allocation to the processor power allocation. In various examples, conditions may be considered that result in the GPU power allocation or processor power allocation being lowered without raising the other's power allocation. Conditions may be considered that result in the GPU power allocation or processor power allocation being raised without lowering the other's power allocation.

Figure 4:
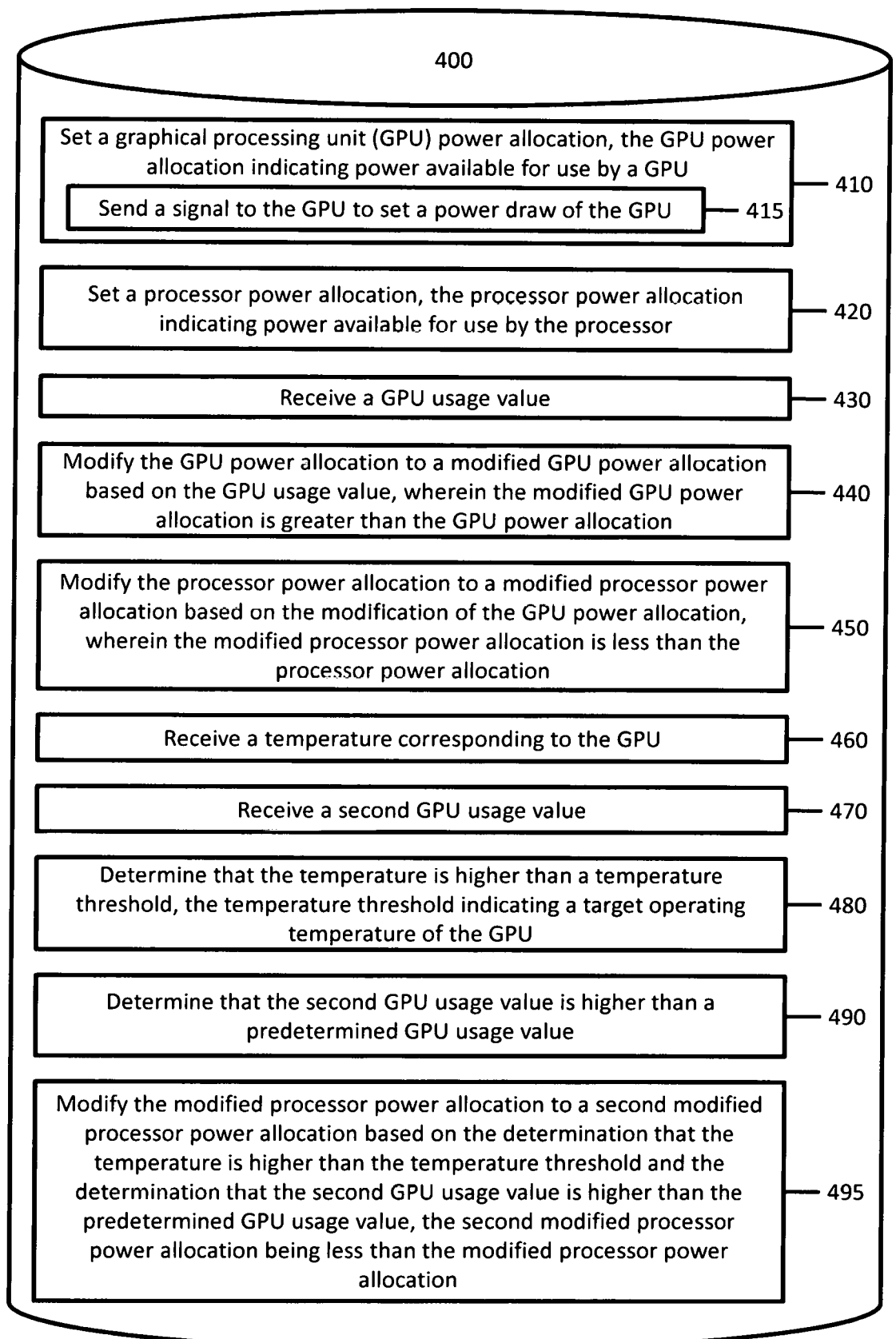
FIG. 4 shows a computer-readable medium containing machine-readable instructions for execution by a processor to lower a processor power allocation in accordance with various examples.

FIG. 4 shows a computer-readable medium 400 containing machine-readable instructions 410, 415, 420, 430, 440, 450, 460, 470, 480, 490, 495 for execution by a processor to lower a processor power allocation in accordance with various examples. Computer-readable medium 400 may include instructions 410 to set a graphical processing unit (GPU) power allocation, the GPU power allocation indicating power available for use by a GPU. Instructions 410 may include instructions 415 to send a signal to the GPU to set a power draw of the GPU. Computer-readable medium 400 may also include instructions to send a signal to the processor to set a power draw of the processor. Computer-readable medium 400 may include instructions 420 to set a processor power allocation, the processor power allocation indicating power available for use by the processor. Computer-readable medium 400 may include instructions 430 to receive a GPU usage value. Computer-readable medium 400 may include instructions 440 to modify the GPU power allocation to a modified GPU power allocation based on the GPU usage value, wherein the modified GPU power allocation is greater than the GPU power allocation. Computer-readable medium 400 may include instructions 450 to modify the processor power allocation to a modified processor power allocation based on the modification of the GPU power allocation, wherein the modified processor power allocation is less than the processor power allocation. Computer-readable medium 400 may include instructions 460 to receive a temperature of the GPU. Computer-readable medium 400 may include instructions 470 to receive a second GPU usage value. Computer-readable medium 400 may include instructions 480 to determine that the temperature is higher than a temperature threshold, the temperature threshold indicating a target operating temperature of the GPU. Computer-readable medium 400 may include instructions 490 to determine that the second GPU usage value is higher than a predetermined GPU usage value. Computer-readable medium 400 may include instructions 495 to modify the modified processor power allocation to a second modifier processor power allocation based on the determination that the temperature is higher than the temperature threshold and the determination that the second GPU usage value is higher than the predetermined GPU usage value, the second modified processor power allocation being less than the modified processor power allocation.

Figure 5:
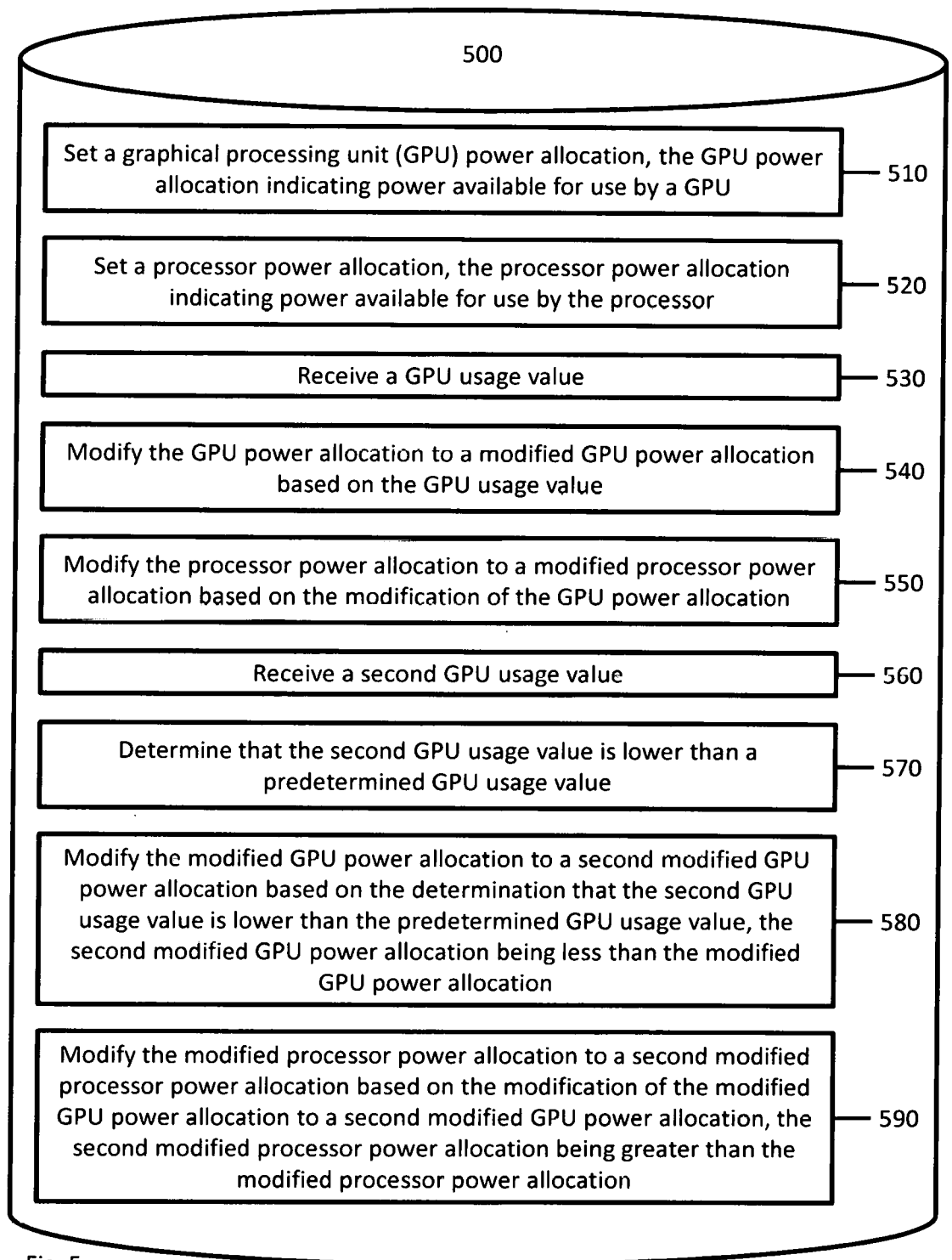
FIG. 5 shows a computer-readable medium containing machine-readable instructions for execution by a processor to lower a GPU power allocation in accordance with various examples.

FIG. 5 shows a computer-readable medium 500 containing machine-readable instructions 510, 520, 530, 540, 550, 560, 570, 580, 590 for execution by a processor to lower a GPU power allocation in accordance with various examples. Computer-readable medium 500 may include instructions 510 to set a graphical processing unit (GPU) power allocation, the GPU power allocation indicating power available for use by a GPU. Computer-readable medium 500 may include instructions 520 to set a processor power allocation, the processor power allocation indicating power available for use by the processor. Computer-readable medium 500 may include instructions 530 to receive a GPU usage value. Computer-readable medium 500 may include instructions 540 to modify the GPU power allocation to a modified GPU power allocation based on the GPU usage value. Computer-readable medium 500 may include instructions 550 to modify the processor power allocation to a modified processor power allocation based on the modification of the GPU power allocation. Computer-readable medium 500 may include instructions 560 to receive a second GPU usage value. Computer-readable medium 500 may include instructions 570 to determine that the second GPU usage value is lower than a predetermined GPU usage value. Computer-readable medium 500 may include instructions 580 to modify the modified GPU power allocation to a second modified GPU power allocation based on the determination that the second GPU usage value is lower than the predetermined GPU usage value, the second modified GPU power allocation being less than the modified GPU power allocation. Computer-readable medium 500 may include instructions 590 to modify the modified processor power allocation to a second modified processor power allocation based on the modification of the modified GPU power allocation to a second modified GPU power allocation, the second modified processor power allocation being greater than the modified processor power allocation.

Figure 6:
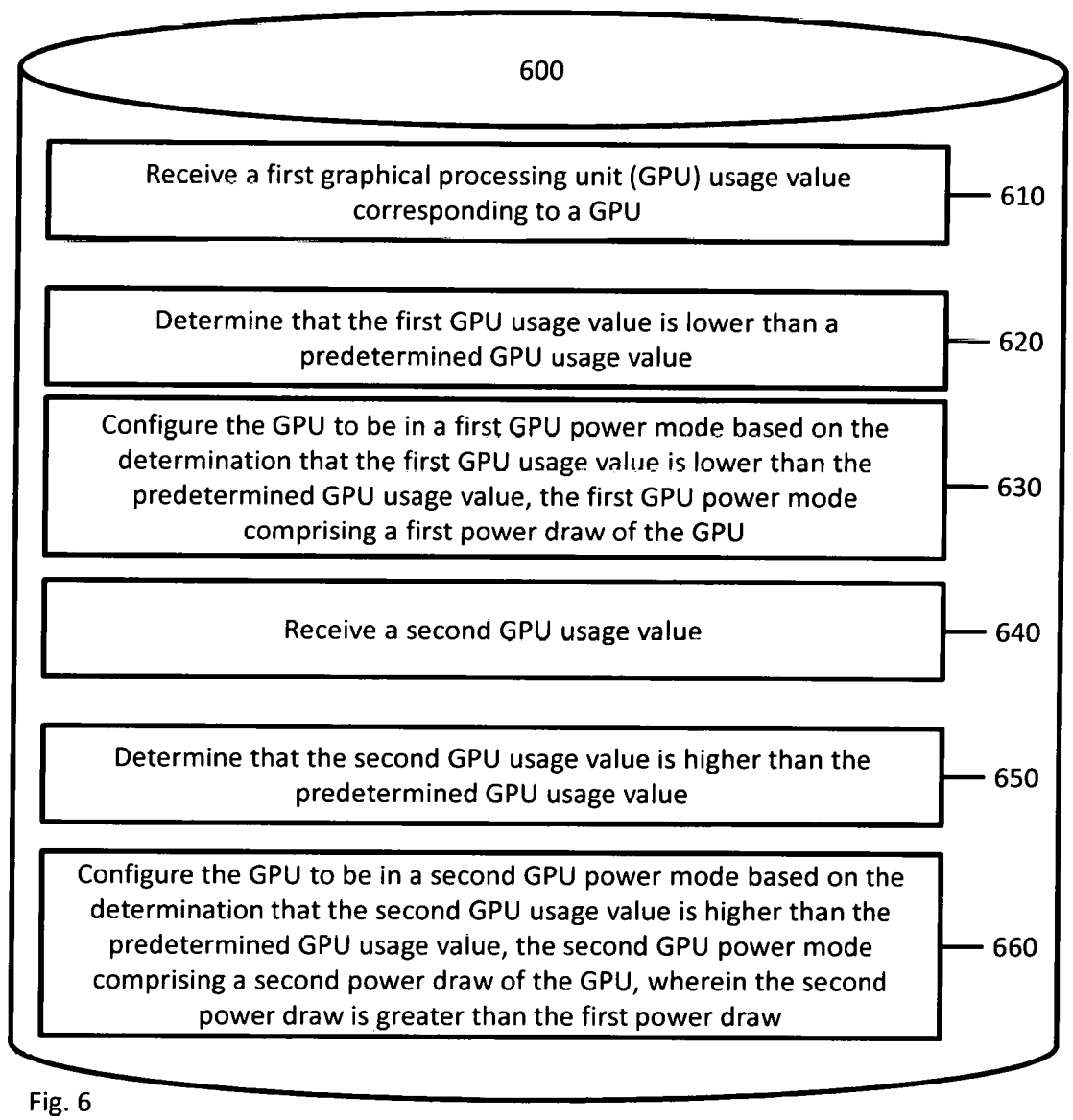
FIG. 6 shows a computer-readable medium containing machine-readable instructions for execution by a processor to set a power draw of a GPU in accordance with various examples.

FIG. 6 shows a computer-readable medium 600 containing machine-readable instructions 610, 620, 630, 640, 650, 660 for execution by a processor to set a power draw of a GPU in accordance with various examples. Computer-readable medium 600 may include instructions 610 to receive a first graphical processing unit (GPU) usage value of a GPU. Computer-readable medium 600 may include instructions 620 to determine that the first GPU usage value is lower than a predetermined GPU usage value. Computer-readable medium 600 may include instructions 630 to set the GPU to be in a first GPU power mode based on the determination that the first GPU usage value is lower than the predetermined GPU usage value, the first GPU power mode comprising a first power draw of the GPU. Computer-readable medium 600 may include instructions 640 to receive a second GPU usage value. Computer-readable medium 600 may include instructions 650 to determine that the second GPU usage value is higher than the predetermined GPU usage value. Computer-readable medium 600 may include instructions 660 to set the GPU to be in a second GPU power mode based on the determination that the second GPU usage value is higher than the predetermined GPU usage value, the second GPU power mode comprising a second power draw of the GPU, wherein the second power draw is greater than the first power draw.

A GPU or processor may be set for a power mode that specifies its power consumption. The power mode may specify a power draw available to the GPU or processor. The power mode may specify a voltage draw or current draw available to the GPU or processor. The GPU or processor may draw less power than what is available to it, such as if it is allocated a high power draw but has a low workload.

Figure 7:
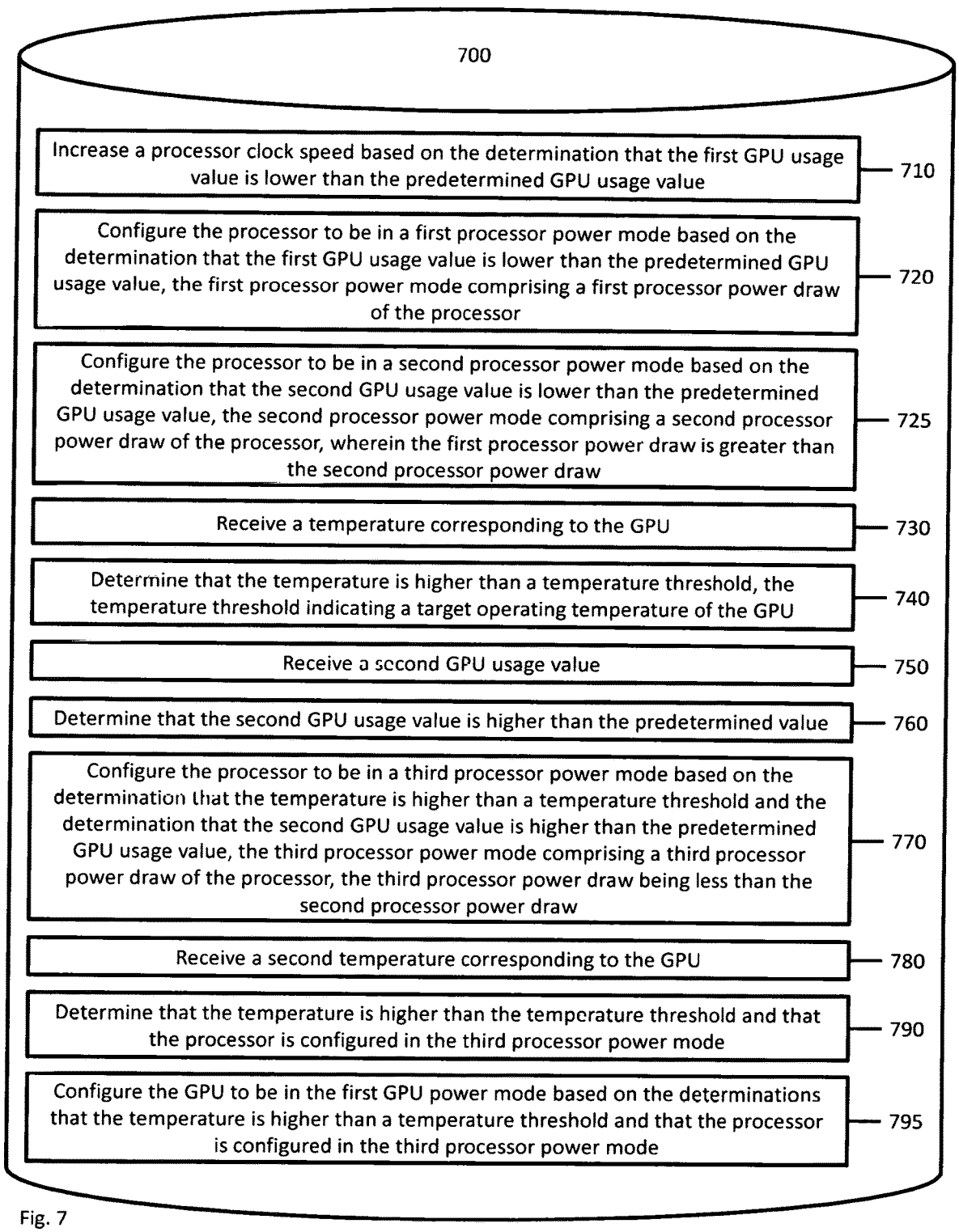
FIG. 7 shows a computer-readable medium containing machine-readable instructions for execution by a processor to set a power draw of a processor in accordance with various examples.

FIG. 7 shows a computer-readable medium 700 containing machine-readable instructions 710, 720, 725, 730, 740, 750, 760, 770, 780, 790, 795 for execution by a processor to set a power draw of a processor in accordance with various examples. Computer-readable medium 700 may also include the machine-readable instructions from FIG. 6. Computer-readable medium 700 may include instructions 710 to increase a processor clock speed based on the determination that the first GPU usage value is lower than the predetermined GPU usage value. Computer-readable medium 700 may include instructions 720 to set the processor to be in a first processor power mode based on the determination that the first GPU usage value is lower than the predetermined GPU usage value, the first processor power mode comprising a first processor power draw of the processor. Computer-readable medium 700 may include instructions 725 to set the processor to be in a second processor power mode based on the determination that the second GPU usage value is lower than the predetermined GPU usage value, the second processor power mode comprising a second processor power draw of the processor, wherein the first processor power draw is greater than the second processor power draw. Computer-readable medium 700 may include instructions 730 to receive a temperature of the GPU. Computer-readable medium 700 may include instructions 740 to determine that the temperature is higher than a temperature threshold, the temperature threshold indicating a target operating temperature of the GPU. Computer-readable medium 700 may include instructions 750 to receive a second GPU usage value. Computer-readable medium 700 may include instructions 760 to determine that the second GPU usage value is higher than the predetermined value. Computer-readable medium 700 may include instructions 770 to set the processor to be in a third processor power mode based on the determination that the temperature is higher than a temperature threshold and the determination that the second GPU usage value is higher than the predetermined GPU usage value, the third processor power mode comprising a third processor power draw of the processor, the third processor power draw being less than the second processor power draw. Computer-readable medium 700 may include instructions 780 to receive a second temperature of the GPU. Computer-readable medium 700 may include instructions 790 to determine that the temperature is higher than the temperature threshold and that the processor is set in the third processor power mode. Computer-readable medium 700 may include instructions 795 to set the GPU to be in the first GPU power mode based on the determinations that the temperature is higher than a temperature threshold and that the processor is set in the third processor power mode.

The GPU's performance may be affected by the GPU temperature. Above a certain temperature, the GPU may malfunction or be damaged. The target operating temperature may be a temperature below the temperature when the GPU malfunctions or is damaged, in order to provide a buffer or margin of error. The power controller may adjust power allocations to keep the GPU temperature at or below the target operating temperature to try and prevent GPU malfunctions or damage.

The processor may be set to use different processor clock speeds. Increasing the processor clock speed may increase the workload the processor is able to perform, but may draw more power. Some processor clock speeds may have a minimum processor power allocation.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing machine-readable instructions that, when executed by a processor of a computer system, cause the processor to:
set a graphical processing unit (GPU) power allocation, the GPU power allocation indicating power available for use by a GPU;
set a central processing unit (CPU) power allocation, the CPU power allocation indicating power available for use by a CPU, wherein a heat dissipator is coupled between the CPU and the GPU;
receive a GPU usage value;

modify the GPU power allocation to a modified GPU power allocation based on the GPU usage value;
modify the CPU power allocation to a modified CPU power allocation based on the modification of the GPU power allocation;
receive a temperature of the GPU;
receive a second GPU usage value;
determine that the temperature is higher than a temperature threshold, the temperature threshold indicating a target operating temperature of the GPU;
determine that the second GPU usage value is higher than a predetermined GPU usage value; and
modify the modified CPU power allocation to a second modified CPU power allocation based on the determination that the temperature is higher than the temperature threshold and the determination that the second GPU usage value is higher than the predetermined GPU usage value, the second modified CPU power allocation being less than the modified CPU power allocation.

2. The non-transitory computer-readable medium of claim 1, wherein the modified GPU power allocation is greater than the GPU power allocation and the modified CPU power allocation is less than the CPU power allocation.

3. The non-transitory computer-readable medium of claim 1, wherein, to set the GPU power allocation, the instructions cause the processor to send a signal to the GPU to set a power draw of the GPU.

4. The non-transitory computer-readable medium of claim 1 wherein the instructions, when executed by the processor, cause the processor to:
receive a second GPU usage value;
determine that the second GPU usage value is lower than a predetermined GPU usage value;
modify the modified GPU power allocation to a second modified GPU power allocation based on the determination that the second GPU usage value is lower than the predetermined GPU usage value, the second modified GPU power allocation being less than the modified GPU power allocation; and
modify the modified CPU power allocation to a second modified CPU power allocation based on the modification of the modified GPU power allocation to a second modified GPU power allocation, the second modified CPU power allocation being greater than the modified CPU power allocation.

5. A system comprising:
a CPU;
a graphical processing unit (GPU) coupled to the CPU via a bus;
a heat dissipator coupled to the CPU and the GPU; and
a power controller, coupled to the CPU and the GPU, wherein the power controller is to:
control a CPU power allocation indicating the power available for use by the CPU and to control a GPU power allocation indicating the power available for use by the GPU, wherein the GPU power allocation is based on a GPU usage value;
receive a temperature of the GPU;
receive a second GPU usage value;
determine that the temperature is higher than a temperature threshold, the temperature threshold indicating a target operating temperature of the GPU;
determine that the second GPU usage value is higher than a predetermined GPU usage value; and
modify the CPU power allocation to a modified CPU power allocation based on the determination that the temperature is higher than the temperature threshold and the determination that the second GPU usage value is higher than the predetermined GPU usage value, the modified CPU power allocation being less than the CPU power allocation.

6. The system of claim 5, wherein the CPU comprises the power controller.

7. The system of claim 5, wherein the CPU power allocation is based on the GPU usage value and the temperature of the GPU.

8. The system of claim 5, wherein the power controller is to determine that the GPU usage value is above the predetermined GPU usage value and to increase the GPU power allocation based on the determination that the GPU usage value is above the predetermined GPU usage value.

9. The system of claim 8, wherein the power controller is to decrease the CPU power allocation based on the increase of the GPU power allocation.

10. A non-transitory computer-readable medium storing machine-readable instructions that, when executed by a processor, cause the processor to:
receive a first graphical processing unit (GPU) usage value of a GPU;
determine that the first GPU usage value is lower than a predetermined GPU usage value;
set the GPU to be in a first GPU power mode based on the determination that the first GPU usage value is lower than the predetermined GPU usage value, the first GPU power mode comprising a first power draw of the GPU;
receive a second GPU usage value;
determine that the second GPU usage value is higher than the predetermined GPU usage value; and
set the GPU to be in a second GPU power mode based on the determination that the second GPU usage value is higher than the predetermined GPU usage value, the second GPU power mode comprising a second power draw of the GPU, wherein the second power draw is greater than the first power draw;
receive a temperature of the GPU;
determine that the temperature is higher than a temperature threshold, the temperature threshold indicating a target operating temperature of the GPU; and
set a CPU to be in a first CPU power mode based on the determination that the temperature is higher than the temperature threshold and the determination that the second GPU usage value is higher than the predetermined GPU usage value, the first CPU power mode comprising a first CPU power draw of the CPU, wherein a heat dissipator is coupled between the CPU and the GPU.

11. The non-transitory computer-readable medium of claim 10 wherein the machine-readable instructions, when executed by the processor, cause the processor to:
set the CPU to be in a second CPU power mode based on the determination that the first GPU usage value is lower than the predetermined GPU usage value, the second CPU power mode comprising a second CPU power draw of the CPU, wherein the second CPU power draw is greater than the first CPU power draw; and
set the CPU to be in a third CPU power mode based on the determination that the second GPU usage value is lower than the predetermined GPU usage value, the third CPU power mode comprising a third CPU power draw of the CPU, wherein the second CPU power draw is greater than the third CPU power draw, and wherein the third CPU power draw is greater than the first CPU power draw.

12. The non-transitory computer-readable medium of claim 10 wherein the machine-readable instructions, when executed by the processor, cause the processor to:
   receive a second temperature of the GPU;
   determine that the temperature is higher than the temperature threshold and that the CPU is set in the first CPU power mode; and
   set the GPU to be in the first GPU power mode based on the determinations that the temperature is higher than a temperature threshold and that the CPU is set in the first CPU power mode.

13. The non-transitory computer-readable medium of claim 10 wherein the machine-readable instructions, when executed by the processor, cause the processor to increase a CPU clock speed based on the determination that the first GPU usage value is lower than the predetermined GPU usage value.

* * * * *